Sept. 5, 1939.  W. R. KING  2,172,141
PACKING RING
Filed June 6, 1936
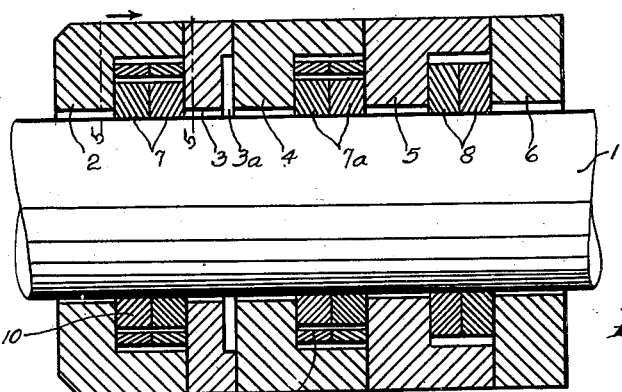
Fig 1
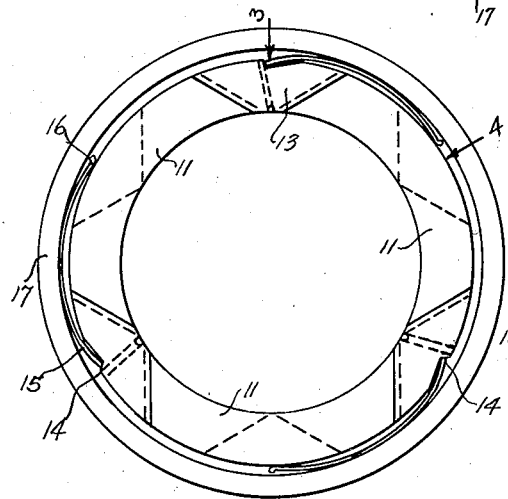
Fig 2
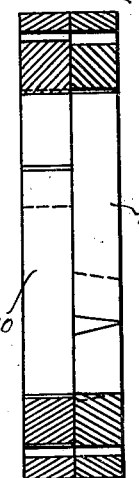
Fig 2A
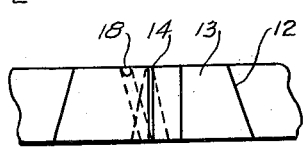
Fig 3
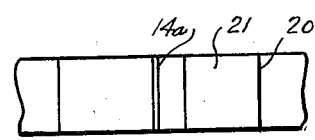
Fig 4
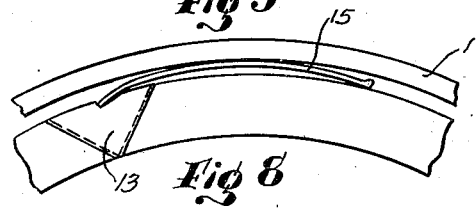
Fig 5
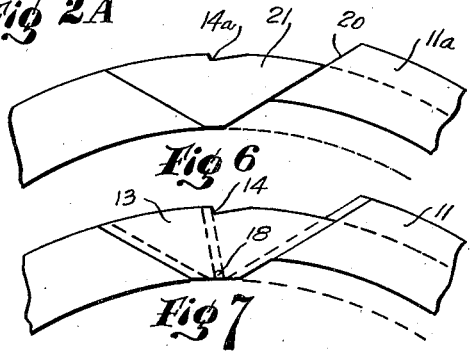
Fig 6
Fig 7
Fig 8
William R. King  INVENTOR.
BY Jesse R. Stone
   Lester B Clark
   ATTORNEYS.

Patented Sept. 5, 1939

2,172,141

UNITED STATES PATENT OFFICE 2,172,141

PACKING RING

William R. King, Mineola, Tex.

Application June 6, 1936, Serial No. 83,855

6 Claims. (Cl. 288—13)

My invention relates to metallic packing rings. The chief purpose of the invention is to seal off the escape around a piston rod of the flaming gases under pressure which occurs during the explosion stroke in a double-acting gas engine cylinder.

It is an object to resist practically all of the pressure by one pair of rings, thus damping the propagation of the flame through the balance of the packing assembly.

A further object of the invention is to provide segmental rings forming the sealing elements which may be moved radially with the rod and relatively with themselves without disturbing the position of the joint blocks, and still not permit pressure to pass by the movable joints.

Another object is to maintain the adjacent joint blocks and sealing elements under tension by a flat leaf spring suspension, using an outer floating ring for equalization of the spring tension and application.

Still another and important object is to devise a method for tapering the joint blocks so that the sealing segments of any one segment ring may move radially with the rod, yet to resist the relative movement of the segments of the ring pairs by holding them against the casings according to the rise and fall of pressure on the outer peripheries of the tapered joint blocks.

I desire to employ the gas pressure to assist in holding the metallic packing in sealing position.

In the drawing Fig. 1 shows the cross section of a fire-check packing on the rod of a double-acting gas or gasoline engine and arranged according to this invention.

Fig. 2 is the end view of a sealing ring pair such as 7 of Fig. 1.

Fig. 2A is the cross section of the ring shown in Fig. 2.

Fig. 3 is a broken plan view of a tapered joint block taken in the direction of the arrow 3 of Fig. 2.

Fig. 4 is a broken plan view of a straight joint block taken in the direction of the arrow 4 of Fig. 2.

Fig. 5 is a plan view partly in section showing the action of the tapered joint block maintaining a closed joint between the sealing segments, said view being taken along lines 5—5 of Fig. 1.

Fig. 6 is a broken end view of a straight joint block and a sealing segment displaced radially.

Fig. 7 is a broken end view of a tapered joint block and a sealing segment displaced radially.

Fig. 8 is a broken end view of a sealing segmental ring and housing ring and the equalizing spring suspension.

Referring now to Fig. 1, a rod 1 is a reciprocating piston rod which connects the engine cross head and the piston under pressure, the packing assembly being located within a stuffing box, not shown, to confine the exploded gases and prevent them from escaping along the rod. The gases under pressure pass along the rod and into the packing case from the left hand side of Fig. 1. Retainer 2 is at the inner end of the stuffing box and is, therefore, in contact with the flaming gases, and seals off against the stuffing box walls to prevent pressure from escaping around the packing case to the atmosphere.

The retainer 2 is the innermost of a plurality of sections of packing members which I find desirable to employ. The inner section including the retainer 2 is recessed on the side away from the pressure to provide room for a plurality of sealing rings which may be designated generally at 7. The second section 4 of packing is similar to the first and is separated therefrom by a spacing member 3 which is a ring of metal having an opening of larger diameter than the outer diameter of the shaft 1 and recessed on the side away from the pressure as shown at 3a to provide an expansion chamber for the hot gases. The outermost of the three sections is designated at 5. It is similar to the section 4 except that the rings 8 housed at the outer end of the retainer 5 are of slightly different construction from those of the innermost sections. The three sections are held in the stuffing box or housing of the motor by means of an outer plate 6, which may be formed in the usual manner to act as a gland to hold the sections firmly within the stuffing box.

It will thus be seen that I have an inner section 2 having two cooperating sealing rings housed at the outer end thereof. The next outer section acts to seal off the packing of gases which have passed the first ring and the outer set of rings 8 will be enabled to positively seal off the escape of any gases from the stuffing box.

In forming one of the units of my stuffing box I employ two rings which were designated at 7 in Fig. 1, these rings being of different construction. There is the ring 9 on the side toward the source of pressure and the ring 10 on the side away from the source of pressure as indicated by the arrow. The ring 9 is made up of a plurality of sections which will be best understood from Fig. 2. I illustrate the use of three such sections. Each section 11 of this ring is identical with the other two sections and is formed with the ends extending in a parallel direction toward the shaft. Each section is thus of arcuate shape but with parallel ends. The ends of each section 11 are, however, beveled when taken longitudinally of the rod. This bevel will be best understood from Fig. 5 where the end 12 of the section 11 is beveled from the outer side toward the inner side and it will be seen that the adjacent ends of the two sections 11 are both beveled from the outer side toward the inner side to receive a wedge block 13 between the ends of the sections.

The wedge block 13 is tapered in two directions. It is tapered from the outer arcuate margin inwardly, as will be seen best in Fig. 2. It is also beveled from the side toward the source of pressure to the opposite side. The wedge block 13 is hence adapted to wedge between the ends of the sections 11 in two directions, in one direction radially toward the rod and the other in a direction away from the source of pressure. The outer side of each wedge block 13 is notched as shown at 14 in Fig. 2 to receive one end of a curved leaf spring 15. This leaf spring has the opposite end slightly curved at 16 and adapted to bear against one of the adjacent sections 11.

The central portion of the spring bears against an outer retaining ring 17. Thus the spring 15 is compressed between the packing ring and the retaining ring so as to exert a resilient pressure against the outer curved face of the wedge block. This resilient force exerted against the wedge block tends to force it inwardly between the ends of the two adjacent sections 11 and because of the taper along the edge 12 the wedge block is thus forced laterally so that its larger side is forced against the wall of the chamber in which the rings are housed.

To allow the escape of the pressure fluid from the source of pressure to pass outwardly into the recess in which the sealing rings are housed I provide a diagonal opening 18 in each of the wedge blocks which extends from the lower larger side of the block outwardly and issues at the smaller side of the block as will be understood from Fig. 5.

The retaining ring 17 which surrounds the packing ring is an endless ring and is spaced somewhat outwardly away from the sealing ring and is also of smaller internal diameter than is the chamber in which the rings are housed.

The adjacent ring 10 of the set is formed closely like the ring just described. It has sections 11a, the ends of which are parallel with each other but the said ends are not tapered longitudinally of the stuffing box. They have only one taper and that is inwardly toward the shaft. This will be understood from Figs. 4 and 6. The ends of the parts indicated at 20 are parallel and not beveled longitudinally. The wedge blocks 21 are formed in the same manner as are the wedge blocks 13 except that they are not beveled longitudinally at the shaft. They are recessed on their outer surfaces, as shown at 14a, to receive springs 15 in the same manner as are the other rings. They do not have the diagonal fluid passage 18 as in the other sealing ring.

The two rings together form a set which cooperate to have a most efficient sealing action under conditions such as are encountered in internal combustion engines. In such engines there is a constant pulsation of gas from the explosion chamber tending to escape along the rod 1. This escaping gas is at high temperature and is in most instances accompanied by flame. Metallic packing made in accordance with my invention is an efficient seal against the escape of such gases. I place on the side adjacent the source of pressure, which I will call for purposes of convenience, the up-stream side, a sealing ring 9. With reference to Fig. 5, it will be seen that when the two rings are in position side by side in the chamber the pressure of the spring, which is omitted in Fig. 5, will force the wedge block 13 inwardly and laterally. The lateral push of the block as it wedges between the ends of the sections in the ring 9 will force the side of the block against the wall of the chamber and will tend to urge the sections 11 toward the opposite end into sealing contact with the ring 10. Gas which may escape along the block will pass outwardly through the passage 18 in the wedge block to the outer side thereof and between the sealing ring and the interior of the retaining ring 17. It will there exert a pressure in the chamber tending to hold the sections of both rings inwardly toward the shaft. The gas, therefore, has the action of forcing the sections of the metallic ring toward the shaft and of forcing the sections 11 of the ring 9 into effective sealing engagement with the ring 10 along their contacting surfaces.

The wedge block 13, therefore, acts as a spring holding the ring 9 against the ring 10 and the gases engaging between the ring 11 and the wall C of the chamber will also assist in forming this seal. The ring 10 will be forced down-stream against the adjacent wall of the chamber, or, in the case of the first set of rings, against the wall of the spacing ring 3. A most efficient sealing engagement is thereby provided.

It is to be understood of course that there is a pulsation in one direction of some short duration and before any of the pressure fluid can escape from my sealing assembly the pulsation is in the opposite direction tending to relieve the pressure on the sealing rings. My arrangement of the two rings forming a set with the ring on the up-stream side arranged with a double tapered wedge block furnishes a most effective packing against the escape of the gases.

Such gas as may escape past the first set of rings has an opportunity to expand within the small expansion chamber 3a shown in Fig. 1. They are thereby partially cooled and the next set of rings 7a, which is identical with the first set, will act in a similar manner to cut down the escape of gas, so that practically no gas will pass the second set. If the gas does escape the second set, however, the third set of sealing rings 8 which are in ordinary form of sealing ring, will tend to check the escape of such gases, the pressure on which at that point will be practically nil.

Figs. 6 and 7 have been added to indicate the manner in which the sections 11 and 11a may move outwardly relative to the wedge blocks. This movement of the sections relative to the blocks has been greatly exaggerated, there being no radial movement of the sections to this extent. It is obvious, however, that the sections 11 being made with parallel ends may have a radial movement of this character which allows the ring to accommodate unequal surfaces on the rod and to conform to any irregularities in the rod which may exist. In some rods, for example, there is a slight taper from one end to the other. Rings made in accordance with my invention will fit along this taper and form a seal and will accommodate the reciprocation of the rod without impairing the sealing effect.

What is claimed as new is:

1. A metallic packing ring made up of a plurality of arcuate segments, the ends of each of said segments being formed to extend in directions parallel with each other, but said ends being beveled from one side of the ring to the other, wedge blocks of approximately triangular shape fitting between the ends of adjacent segments, said blocks also being beveled longitudinally to engage said ends and to have a wedging action both circumferentially and longitudinally therewith.

2. A metallic packing ring made up of a plurality of arcuate segments, the ends of each of said segments being formed to extend in directions parallel with each other, but said ends being beveled from one side of the ring to the other, wedge blocks of approximately triangular shape fitting between the ends of adjacent segments, said blocks also being beveled longitudinally to engage said ends and to have a wedging action both circumferentially and longitudinally therewith, and means to force said blocks resiliently inwardly.

3. A set of metallic rod packing rings formed to fit within a chamber about said rod, including a sectional packing ring shaped to fit flexibly about the rod, a second ring adjacent thereto on the side toward the source of pressure fluid, said second ring being formed of a plurality of arcuate segments, the adjacent ends of which form a seat tapered inwardly toward the rod and also tapered downstream away from said source, a wedge block shaped to fit said seat and means to force said block inwardly toward said rod.

4. A set of rod packing rings adapted to fit within a chamber in a holding section, each of said rings comprising a plurality of segments, the ends of which are approximately parallel, wedge blocks fitting between the ends of adjacent blocks, springs to move said blocks inwardly, the wedge block on the ring adjacent the source of fluid pressure being tapered longitudinally of the rod so that when forced toward the shaft it will move laterally against the wall of the said chamber and exert a thrust against the adjacent ring.

5. A metallic packing ring for stuffing boxes comprising a plurality of segmental sections, the adjacent ends of said sections being beveled to provide between said ends recesses tapering inwardly and longitudinally of said stuffing box, wedge shaped blocks fitting within said recesses, means tending to hold said blocks resiliently inwardly and to wedge said blocks and said sections longitudinally of the stuffing box and against the opposed ends of said box in the manner described.

6. A metallic packing ring for stuffing boxes comprising a plurality of segmental sections, the adjacent ends of said sections being beveled to provide between said ends recesses tapering inwardly and longitudinally of said stuffing box, wedge shaped blocks fitting within said recesses, springs on the outer peripheries of said sections and said blocks to hold said blocks depressed between said sections and thus move said sections longitudinally of said stuffing box, and passages in said blocks to conduct pressure fluid from within said ring outwardly to the outer side thereof.

WILLIAM R. KING.